United States Patent [19]

Duchardt et al.

[11] 4,268,267
[45] May 19, 1981

[54] PHTHALOCYANINE REACTIVE DYESTUFFS

[75] Inventors: Karl H. Duchardt; Manfred Groll, both of Cologne; Klaus Wunderlich, Leverkusen, all of Fed. Rep. of Germany

[73] Assignee: Bayer Aktiengesellschaft, Leverkusen, Fed. Rep. of Germany

[21] Appl. No.: 86,611

[22] Filed: Oct. 19, 1979

[30] Foreign Application Priority Data

Nov. 17, 1978 [DE] Fed. Rep. of Germany ....... 2849068

[51] Int. Cl.$^3$ ...................... C09B 62/06; C09B 47/04
[52] U.S. Cl. ............................................ 8/549; 8/661; 8/918; 260/242.2; 544/181; 544/194
[58] Field of Search ..................... 260/242.2; 544/181, 544/194; 8/549, 661, 918

[56] References Cited

U.S. PATENT DOCUMENTS

| | | | |
|---|---|---|---|
| 2,219,330 | 10/1940 | Nadler et al. | 260/314.5 |
| 3,651,058 | 3/1972 | Poole | 260/242.2 |
| 4,052,386 | 10/1977 | Bein et al. | 260/242.2 |
| 4,115,378 | 9/1978 | Bien et al. | 544/181 |

FOREIGN PATENT DOCUMENTS

| | | |
|---|---|---|
| 868483 | 12/1978 | Belgium . |
| 1118785 | 7/1968 | United Kingdom . |
| 1208553 | 10/1970 | United Kingdom . |
| 1526840 | 10/1978 | United Kingdom . |
| 1549820 | 8/1979 | United Kingdom . |

*Primary Examiner*—A. Lionel Clingman
*Attorney, Agent, or Firm*—Sprung, Felfe, Horn, Lynch & Kramer

[57] ABSTRACT

Dyestuffs of the formula

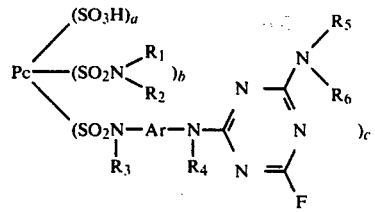

wherein
Pc, $R_1$, $R_2$, $R_3$, $R_4$, Ar, $R_5$, $R_6$, a, b and c have the meaning indicated in the description, and their use for dyeing and printing materials which contain hydroxyl or amide groups, such as textile fibres, filaments and fabrics made of wool, silk and synthetic polyamide and polyurethane fibres and for wash-fast dyeing and printing of natural or regenerated cellulose.

11 Claims, No Drawings

PHTHALOCYANINE REACTIVE DYESTUFFS

The invention relates to new water-soluble phthalocyanine dyestuffs which, in the form of their free acids, have the formula

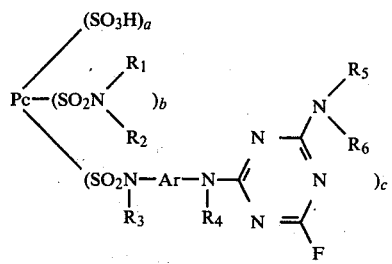

wherein
Pc is the radical of a copper phthalocyanine or nickel phthalocyanine,
$R_1$ and $R_2$ are hydrogen or optionally substituted alkyl, or $R_1+R_2$ together with N are a 5-membered or 6-membered heterocyclic ring,
$R_3$ and $R_4$ are hydrogen or optionally substituted alkyl,
Ar is arylene substituted by $SO_3H$ or/and COOH and optionally by other atoms or groups of atoms,
$R_5$ and $R_6$ are hydrogen, optionally substituted alkyl, cycloalkyl or aralkyl or an optionally substituted aryl radical which is free from sulphonic acid and carboxylic acid groups, or $R_5+R_6$ together with N are a 5-membered or 6-membered heterocyclic ring,
a is 1 to 3,
b is 0 to 2,
c is 1 or 2 and
$a+b+c \leq 4$,
and mixtures thereof.

In the dyestuffs of the formula (I), each sulphonic acid group or sulphonamide group is bonded to a different benzene ring of the phthalocyanine in the 3-position or 4-position.

The radicals $R_1$ and $R_2$, $R_3$ and $R_4$ and also $R_5$ and $R_6$ can be identical or different.

Examples which may be mentioned of optionally substituted alkyl radicals $R_1$ and $R_2$ are: $C_1$—$C_5$-alkyl radicals, such as methyl, ethyl, propyl, butyl and amyl, β-hydroxyethyl and γ-hydroxypropyl, β-carboxyethyl and η-sulphoethyl.

Examples of optionally substituted alkyl radicals $R_3$ and $R_4$ are $C_1$—$C_5$-alkyl radicals, such as methyl, ethyl and propyl radicals, β-hydroxyethyl and β-hydroxypropyl.

The arylene radical Ar is substituted by at least one sulphonic acid and/or carboxylic acid group. In addition, it can be substituted by further atoms or groups of atoms, for example by $C_1$—$C_4$-alkyl groups, $C_1$—$C_4$-alkoxy groups, halogen atoms or sulphonamide or carboxamide groups, or interrupted by keto groups, sulphone groups, carboxamido groups, urea groups, amino groups, imino groups, ethylene groups or oxygen atoms.

Examples of which may be mentioned of such arylene radicals are 2-carboxy-1,4-phenylene, 2-carboxy-1,5-phenylene, 3-carboxy-1,5-phenylene, N,N'-bis-(3-carboxy-4-phenylene)-urea, 1-carboxy-3,4-phenylene, 3,3'-dicarboxy-4,4'-diphenylene, 4-sulpho-1,3-phenylene, 3-sulpho-1,4-phenylene, 2-methyl-5-sulpho-1,3-phenylene, N,N'-bis-(3-sulpho-4-phenylene)-urea, 2-sulpho-4-methyl-1,5-phenylene, 2-methyl-5-sulpho-1,3-phenylene, 1-sulpho-3,4-naphthylene, 1-sulpho-4,5-naphthylene, 5-sulpho-1,2-naphthylene, 5-sulpho-2,4-naphthylene, 2-sulpho-5,8-naphthylene, 3-sulpho-4,4'-diphenylene, 1,3-disulpho-4,6-phenylene, 1,3-disulpho-5,6-naphthylene, 1,5-disulpho-3,7-naphthylene, 1-sulpho-4-methoxy-2,5-phenylene, 2-carboxy-5-chloro-1,4-phenylene, 2,2'-disulpho-5,5'-dimethyl-4,4'-diphenylene and 2,2'-disulpho-4,4'-stilbenylene.

Examples of radicals $R_5$ and $R_6$ are: hydrogen, $C_1$—$C_5$-alkyl radicals, such as methyl, ethyl, propyl, butyl, isobutyl and amyl; substituted $C_1$—$C_5$-alkyl radicals, such as β-hydroxyethyl, γ-hydroxypropyl, β-methoxyethyl, γ-methoxypropyl, β-ethoxyethyl, γ-ethoxypropyl, carboxymethyl, β-carboxyethyl and β-sulphoethyl; cycloalkyl radicals, such as cyclohexyl, 2-methylcyclohexyl, 3-methylcyclohexyl and 4-methylcyclohexyl; aralkyl radicals, such as benzyl and β-phenylethyl; and aryl radicals which are free from sulphonic acid groups and carboxylic acid groups, such as phenyl, 2-naphthyl, 3-methylphenyl, 4-methylphenyl, 3,4-dimethylphenyl, 3,5-dimethylphenyl, 3-ethylphenyl, 3-chlorophenyl, 4-chlorophenyl, 3,4-dichlorophenyl, 3,5-dichlorophenyl, 3-methyl-4-chlorophenyl, 4-methyl-4-chlorophenyl, 3-methoxyphenyl, 4-methoxyphenyl, 3-ethoxyphenyl, 4-ethoxyphenyl, 3-nitrophenyl, 4-nitrophenyl, 3-carboxamidophenyl and 3-acetylaminophenyl.

Examples in which $R_5$ and $R_6$ together with N form a heterocyclic ring are given when $R_5$ and $R_6$ together represent the pentamethylene group or the grouping $-C_2H_5-O-C_2H_4$.

A preferred group of dyestuffs amongst the dyestuffs according to the invention are those of the general formula (I)
wherein
Pc is the radical of a copper phthalocyanine or nickel phthalocyanine,
$R_1$, $R_2$, $R_3$ and $R_4$ are hydrogen, methyl or ethyl,
Ar is an arylene radical substituted by $SO_3H$ or COOH and optionally by other atoms or groups of atoms,
$R_5$ and $R_6$ are hydrogen, optionally substituted alkyl with 1 to 5 C atoms, optionally substituted cycloalkyl or aralkyl, or an optionally substituted aryl radical which is free from sulphonic acid groups and carboxylic acid groups, or $R_5$ and $R_6$ together with N are a 5-membered or 6-membered heterocyclic ring,
a is 1 to 3,
b is 0 to 2,
c is 1 or 2 and
$a+b+c \leq 4$.

A particularly preferred group of dyestuffs amongst the dye-stuffs according to the invention are those of the general formula (I)
in which
Pc is the radical of a copper phthalocyanine or nickel phthalocyanine,
$R_1$, $R_2$, $R_3$ and $R_4$ are hydrogen, methyl or ethyl,
Ar is an arylene radical which is substituted by $SO_3H$ or COOH and optionally by other atoms or groups of atoms,
$R_5$ and $R_6$ are hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$ together with N are a 5-membered or 6-membered heterocyclic ring, $1 < a < 3$,
$b > 0$,
c is 1 and
$a+b+c=3$ or 4.

A further particularly preferred group of dyestuffs amongst the dyestuffs according to the invention are those of the general formula (I)
in which
Pc is the radical of a copper phthalocyanine or nickel phthalocyanine,
$R_1$, $R_2$, $R_3$ and $R_4$ are hydrogen, methyl or ethyl,
Ar is an arylene radical which is substituted by $SO_3H$ or COOH and optionally by other atoms or groups of atoms,
$R_5$ and $R_6$ are hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$ together with N are a 5-membered or 6-membered heterocyclic ring,
$1 < a < 3$,
$b > 0$,
c is 1 and
$a+b+c=3$ or 4.

A further particularly preferred group of dyestuffs amongst the dyestuffs according to the invention are those of the general formula (I)
in which
Pc is the radical of a copper phthalocyanine or nickel phthalocyanine,
$R_1$, $R_2$, $R_3$ and $R_4$ are hydrogen, methyl or ethyl,
Ar is an arylene radical which is substituted by $SO_3H$ or COOH and optionally by other atoms or groups of atoms,
$R_5$ and $R_6$ are hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$ together with N are a 5-membered or 6-membered heterocyclic ring,
a is 1 or 2,
b is 0,
c is 1 and
$a+c=2$ or 3.

The new dyestuffs of the formula (I) are prepared by a condensation reaction of suitable starting components. For this purpose, dyestuffs which in the form of their free acids have the formula

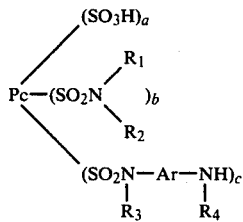 (II)

can be reacted either first with trifluorotriazine and then with an amine of the formula

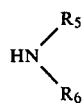 (III), or with a difluorotriazine derivative of the formula

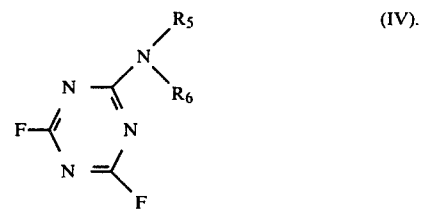 (IV).

When compounds (II) in which Ar represents sulphoarylene with the sulpho group in the o-position relative to the $-NH-R_4$ group are used, these are appropriately reacted first with trifluorotriazine and then with (III).

In the formulae (II), (III) and (IV), $R_1$ to $R_6$ and also Ar, a, b and c have the meaning indicated above.

Examples of suitable compounds of the formula (III) are: ammonia, methylamine, dimethylamine, ethylamine, diethylamine, propylamine, butylamine, dibutylamine, isobutylamine, amylamine, β-hydroxyethylamine, γ-hydroxypropylamine, methyl-β-hydroxyethylamine, methoxyethylamine, ethoxyethylamine, N-β-hydroxyethyl-N-ethylamine, aminoacetic acid, aminopropionic acid, β-amino-ethanesulphonic acid, cyclohexylamine, 3-methylcyclohexylamine, benzylamine, aniline, 2-naphthylamine, m-toluidine, p-toluidine, 3,4-dimethylaniline, 3,5-dimethylaniline, 3-ethylaniline, 3-chloroaniline, 4-chloroaniline, 3,4-dichloroaniline, 3,5-dichloroaniline, 3-methyl-4-chloroaniline, 4-methyl-3-chloroaniline, 3-methoxyaniline, 4-methoxyaniline, 3-ethoxyaniline, 4-ethoxyaniline, 3-nitroaniline, 4-nitroaniline, 3-aminobenzoic acid amide, N-methylaniline, N-ethylaniline, 3-amino-acetanilide, 4-methylamino--acetanilide, piperidine, morpholine, o-toluidine, 2-methoxy-aniline, 2-ethoxyaniline, 2,4-dimethylaniline, 2,5-dimethylaniline and 2-chloroaniline.

These reactions are acylation reactions and can be carried out in an aqueous, aqueous-organic or organic, preferably weakly acid to weakly alkaline medium at temperatures of $-10°$ to $+80°$ C. and preferably of $-5°$ to $+10°$ C.

The phthalocyanine compounds of the formula (II) which are used in the process according to the invention can be prepared by reacting a phthalocyaninesulphonic acid chloride—preferably in the form of an aqueous suspension of the formula

 (V)

wherein
Pc has the meaning indicated above,
m designates the numbers 0, 1 or 2 and
n designates the numbers 2, 3 or 4 and
the sum m plus n is not greater than 4,
with diamines or monoacylated diamines of the formula

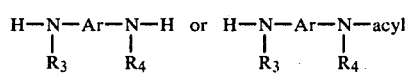

(VIa) (VIb)

and optionally with a compound of the formula

in which formulae
R$_1$, R$_2$, R$_3$, R$_4$ and Ar have the meaning indicated above,
and, if monoacylated diamines of the formula (VIb) are used, subjecting the terminal acylamino group in the resulting phthalocyanine compounds to acid or alkaline saponification. In this reaction unconverted sulphonic acid chloride groups are converted to sulphonic acid groups.

Phthalocyaninesulphonyl chlorides and phthalocyaninesulphonyl chloride-sulphonic acids of the formula (V) can be obtained by treating the corresponding phthalocyanine or the phthalocyaninesulphonic acid with chlorosulphonic acid and, optionally, an acid halide, such as thionyl chloride, phosphorus pentachloride, phosphorus oxychloride or phosphorus trichloride, as described in British Pat. Nos. 708,543, 784,834 and 785,629 and U.S. Pat. No. 2,219,330.

According to the invention it is possible to use phthalocyanine dyestuffs which are single compounds, that is to say those in which the letters a, b and c characterise the numbers 0, 1, 2 or 3. In addition, however, it is also possible to use mixtures of these dyestuffs. Sometimes mixtures of this type have particular advantages in respect of solubility and substantivity. In such mixtures the average value of the numbers varies.

Mixtures, according to the invention, of this type are prepared, for example, from two or more end dyestuffs of the formula (I), each of which is a single compound, or, particularly advantageously by using a mixture of the starting components. The latter frequently is necessarily formed since the phthalocyaninesulphonyl chloridesulphonic acids (V) are frequently obtained industrially in the form of mixtures, in respect of the degree of sulphonation and the ratio of sulphonyl chloride groups and sulphonic acid groups contained therein.

The following may be mentioned as examples of suitable diamines of the formula (VIa) and suitable monoacylated diamines of the formula (VIb): 1,4-diaminobenzenesulphonic acid, 1,3-diaminobenzene-4-sulphonic acid, 2-sulpho-4-methyl-1,3-phenylenediamine, N,N'-bis-(3-sulpho-4-aminophenyl)-urea, 2-sulpho-4-methyl-1,5-phenylenediamine, 2-methyl-5-sulpho-1,3-phenylenediamine, 4,4'-diamino-(1,1'-biphenyl)-3-sulphonic acid, 1-sulpho-3,4-naphthenediamine, 1-sulpho-4,5-naphthylenediamine, 5-sulpho-1,2-naphthylenediamine, 5-sulpho-2,4-naphthylenediamine, 2-sulpho-5-acetylamino-8-aminonaphthalene, 2-amino-5-acetylamino-benzoic acid, 2-amino-4-acetylaminobenzoic acid, 3-amino-5-acetylaminobenzoic acid, 2-sulpho-4-aminophenyl-oxamic acid, N,N'-bis-(4-amino-3-carboxyphenyl)-urea, 6-amino-2-acetylaminotoluene-4-sulphonic acid, 4-amino-4'-acetylaminodiphenylamine-2-sulphonic acid, 2-amino-5-[(3-aminobenzoyl)-amino]-benzenesulphonic acid, 4-amino-2-acetylamino-benzoic acid and 4,6-diaminotoluene-3-sulphonic acid.

The new dyestuffs are extremely valuable products which are suitable for very diverse applications.

As water-soluble compounds they are of interest for dyeing and printing textile materials which contain hydroxyl groups and textile materials which contain nitrogen, especially textile materials made of natural and regenerated cellulose, and also materials made of wool, silk and synthetic polyamide and polyurethane fibres. They are particularly suitable as reactive dyestuffs for dyeing and printing cellulose materials by the techniques recently disclosed for this purpose. The resulting fastness properties, especially the wet-fastness properties, are excellent.

For dyeing and printing cellulose, the dyestuffs are preferably employed in an aqueous solution, to which substances having an alkaline reaction, such as an alkali metal hydroxide or alkali metal carbonate, or compounds which are converted to substances having an alkaline reaction, such as an alkali metal bicarbonate or Cl$_3$C—COONa, can be added. Further auxiliaries can be added to the solution but these should not react in an undesirable manner with the dyestuffs. Such additives are, for example, surface-active substances, such as alkyl sulphates, or substances which prevent the migration of the dyestuff, or dyeing auxiliaries, such as urea or inert thickeners, such as oil/water emulsions, tragacanth, starch, alginate or methylcellulose.

The solutions or pastes prepared in this way are applied to the material to be dyed, for example by padding in a padder (short liquor) or by printing, and then heated for some time at elevated temperature, preferably 40° to 150° C. Heating can be carried out in a hot flue, in a steaming apparatus, on heated rollers or by introducing the material into heated concentrated salt baths and these operations can be carried out either on their own or successively in any order.

When a padding or dyeing liquor without alkali is used, passage of the dry goods through a solution which has an alkaline reaction and to which sodium chloride or Glauber's salt is added follows dyeing. The addition of a salt reduces the migration of the dyestuff from the fibre.

The material to be dyed can also be pre-treated with one of the abovementioned acid-binding agents, then treated with the solution or paste of the dyestuff and finally fixed at elevated temperature, as indicated.

For dyeing from a long liquor, the material is introduced into an aqueous solution of the dyestuff (liquor ratio 1:5 to 1:40) at room temperature and dyed for 40 to 90 minutes, raising the temperature to 95° C. if necessary and optionally adding, in portions, a salt, for example sodium sulphate and then alkali, for example sodium phosphates, sodium carbonate, NaOH or KOH.

The chemical reaction between the dyestuff and the fibre than takes place. After chemical fixing has been carried out, the dyed material is rinsed hot and finally soaped, by which means non-fixed residues of the dyestuff are removed. Dyeings with excellent fastness properties, especially wet-fastness properties and fastness to light, are obtained.

In the so-called cold pad-batch method, subsequent heating of the padded fabric can be saved by storing the fabric at room temperature for some time, for example 2 to 20 hours. In this process, a stronger alkali is employed than in the case of the dyeing method from a long liquor, which has been described above.

For printing materials containing hydroxyl groups, a printing paste consisting of the dyestuff solution, a thickener, such as sodium alginate, and a compound which has an alkaline reaction or splits off alkali on heating, such as sodium carbonate, sodium phosphate, potassium carbonate, potassium acetate or sodium bicarbonate and potassium bicarbonate, is used and the printed material is rinsed and soaped.

Textile materials containing amide groups, such as wool, silk and synthetic polyamide and polyurethane fibres, are generally dyed in the acid to neutral range by the dyeing methods customary for this purpose.

The dyeings obtainable with the new dyestuffs are in general distinguished by good to very good fastness properties, especially by outstanding wet-fastness properties.

The present invention also relates to difluorotriazinyl compounds, which, in the form of the free acid, have the formula

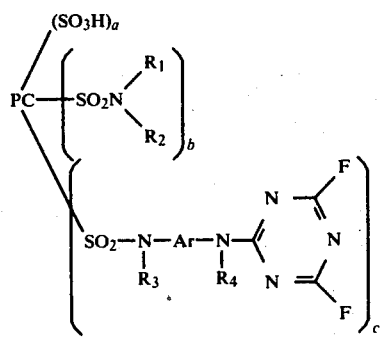

wherein

Pc, $R_1$–$R_4$ and a, b and c have the meaning indicated above.

These compounds are obtained as defined above, by reacting trifluorotriazine with (II).

EXAMPLE 1

10.65 g of the dyestuff of the formula

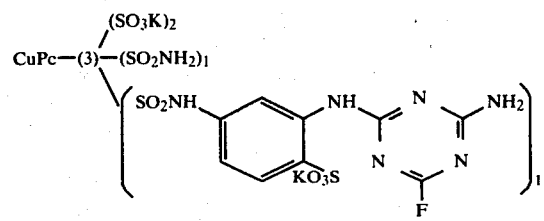

(obtained by reacting CuPc-(3)-(SO$_2$Cl/SO$_3$H)$_4$ with 2,4-diaminobenzenesulphonic acid and ammonia) are dissolved in 150 ml of water with the aid of sodium hydroxide solution, at pH 4–5. After cooling the solution, 1.75 g of 2,4,6-trifluorotriazine are allowed to run in dropwise at 0°–5° C., a pH value of 3.3–3.8 being maintained with the aid of a 1 N NaHCO$_3$ solution, and the mixture is stirred for a further 5 minutes at 0° C., whilst maintaining the indicated pH value.

1.05 g of ammonia (25%) are added to the solution of the difluorotriazinyl compound, which is thus obtained, and, with warming to 20°–25° C., the reaction mixture is kept at pH 8.5–10 until the reaction has ended. The dyestuff is salted out with KCl, filtered off, washed with dilute KCl solution and dried at 50°–60° C. The dyestuff which, in the form of its K salt, has the formula is obtained in virtually quantitative yield. Cotton can be printed in a turquoise shade with this dyestuff.

Further valuable reactive dyestuffs are obtained analogously when the aminophthalocyanine derivatives indicated in column 2 of Table 1 which follows are subjected to a condensation reaction, first with 2,4,6-trifluorotriazine and then when the amines indicated in column 3.

TABLE 1

| No. | Aminophthalocyanine derivative | Amine | Colour shade on cotton |
|---|---|---|---|
| 1 | CuPc—(4)—(SO$_3$H)$_2$/(SO$_2$NH$_2$)$_1$ \{SO$_2$NH–C$_6$H$_3$(NH$_2$)(SO$_3$H)\}$_1$ | HN(CH$_3$)$_2$ | turquoise-blue |
| 2 | CuPc—(3)—(SO$_3$H)$_2$/(SO$_2$NH$_2$)$_1$ \{SO$_2$NH–C$_6$H$_3$(SO$_3$H)(NH$_2$)\}$_1$ | H$_2$NCH$_3$ | turquoise-blue |
| 3 | CuPc—(3)—(SO$_3$H)$_2$ \{SO$_2$NH–C$_6$H$_3$(NH$_2$)(SO$_3$H)\}$_1$ | HN(C$_2$H$_5$)$_2$ | turquoise-blue |

TABLE 1-continued

| No. | Aminophthalocyanine derivative | Amine | Colour shade on cotton |
|---|---|---|---|
| 4 | CuPc—(4)—(SO$_3$H)$_2$(SO$_2$NH$_2$)$_1$ { SO$_2$NH—C$_6$H$_3$(NH$_2$)(SO$_3$H) }$_1$ | HN(C$_4$H$_9$)$_2$ | turquoise-blue |
| 5 | CuPc—(3)—(SO$_3$H)$_1$(SO$_2$NH$_2$)$_1$ { SO$_2$NH—C$_6$H$_3$(NH$_2$)(SO$_3$H) }$_1$ | H$_2$N—CH$_2$CH$_2$—OH | turquoise-blue |
| 6 | CuPc—(3)—(SO$_3$H)$_2$(SO$_2$NH$_2$)$_1$ { SO$_2$NH—C$_6$H$_4$—CONH—C$_6$H$_3$(SO$_3$H)(NH$_2$) }$_1$ | H$_2$N—CH$_2$CH$_2$—OCH$_3$ | turquoise-blue |
| 7 | CuPc—(3)—(SO$_3$H)$_2$(SO$_2$NH$_2$)$_1$ { SO$_2$NH—C$_6$H$_3$(NH$_2$)(SO$_3$H) }$_1$ | H$_2$N—CH$_2$COOH | turquoise-blue |
| 8 | CuPc—(3)—(SO$_3$H)$_1$(SO$_2$NHCH$_3$)$_1$ { SO$_2$NH—C$_6$H$_3$(NH$_2$)(SO$_3$H) }$_1$ | H$_2$N—CH$_2$CH$_2$—SO$_3$H | turquoise-blue |
| 9 | CuPc—(3)—(SO$_3$H)$_2$(SO$_2$NH$_2$)$_1$ { SO$_2$NH—C$_6$H$_4$—C$_6$H$_3$(SO$_3$H)(NH$_2$) }$_1$ | H$_2$NCH$_3$ | turquoise-blue |
| 10 | CuPc—(3)—(SO$_3$H)$_2$ { SO$_2$N(CH$_3$)$_2$ }$_1$ { SO$_2$NH—C$_6$H$_3$(NH$_2$)(SO$_3$H) }$_1$ | HN(CH$_3$)$_2$ | turquoise-blue |
| 11 | NiPc—(3)—(SO$_3$H)$_2$ { SO$_2$NH—C$_6$H$_3$(SO$_3$H)(NH$_2$) }$_1$ | H$_2$NCH$_3$ | bluish-tinged green |
| 12 | NiPc—(3)—(SO$_3$H)$_2$ { SO$_2$NH—C$_6$H$_3$(NH$_2$)(SO$_3$H) }$_1$ | HN(CH$_2$CH$_2$OH)$_2$ | bluish-tinged green |

TABLE 1-continued

| No. | Aminophthalocyanine derivative | Amine | Colour shade on cotton |
|---|---|---|---|
| 13 | CuPc—(3)—(SO$_3$H)$_2$/(SO$_2$NH$_2$)$_1$ / {SO$_2$NH—C$_6$H$_3$(NH$_2$)(SO$_3$H)}$_1$ | HN(CH$_3$)(CH$_2$CH$_2$OH) | turquoise-blue |
| 14 | CuPc—(3)—(SO$_3$H)$_2$ / {SO$_2$NH—C$_6$H$_3$(SO$_3$H)(NH$_2$)}$_1$ | HN(CH$_3$)(CH$_2$CH$_2$OCH$_3$) | turquoise-blue |
| 15 | CuPc—(4)—(SO$_3$H)$_2$/(SO$_2$NH$_2$)$_1$ / {SO$_2$NH—C$_6$H$_3$(NH$_2$)(SO$_3$H)}$_1$ | HN(CH$_2$CH$_2$OCH$_3$)$_2$ | turquoise-blue |
| 16 | CuPc—(3)—(SO$_3$H)$_1$/(SO$_2$NHCH$_3$)$_1$ / {SO$_2$NH—C$_6$H$_3$(SO$_3$H)(NH$_2$)}$_1$ | H$_2$NCH$_2$CH$_2$OSO$_3$H | turquoise-blue |
| 17 | CuPc—(3)—(SO$_3$H)$_2$/(SO$_2$NH$_2$)$_1$ / {SO$_2$NH—C$_6$H$_4$—C$_6$H$_3$(NH$_2$)(SO$_3$H)}$_1$ | HN(piperidine) | turquoise-blue |
| 18 | CuPc—(3)—(SO$_3$H)$_2$ / {SO$_2$NH—C$_6$H$_3$(NH$_2$)(SO$_3$H)}$_1$ | H$_2$NCH$_2$—C$_6$H$_5$ | turquoise-blue |
| 19 | CuPc—(3)—(SO$_3$H)$_2$/(SO$_2$NH$_2$)$_1$ / {SO$_2$NH—C$_6$H$_3$(NH$_2$)(SO$_3$H)}$_1$ | H$_2$NCH(CH$_3$)$_2$ | turquoise-blue |
| 20 | CuPc—(3)—(SO$_3$H)$_3$ / {SO$_2$NH—C$_6$H$_3$(NH$_2$)(SO$_3$H)}$_1$ | H$_2$N—C(CH$_3$)$_2$—CH$_2$OH | turquoise-blue |
| 21 | CuPc—(3)—(SO$_3$H)$_2$ / {SO$_2$NH—C$_6$H$_3$(SO$_3$H)(NH$_2$)}$_1$ | H$_2$N—C(CH$_2$OH)$_2$—CH$_3$ | turquoise-blue |

EXAMPLE 2

If the solution of the difluorotriazinyl compound of the formula

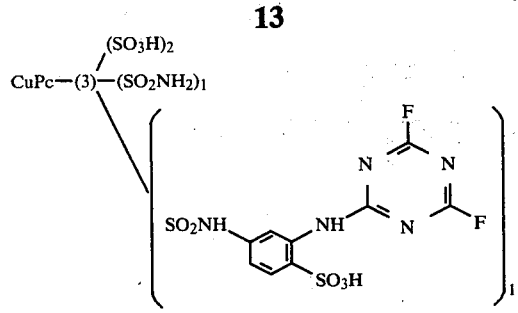

which is obtained according to Example 1 is reacted at pH 5.5–6.5 with 1.61 g of N-methylaniline and in other respects the procedure of Example 1 is followed, the dyestuff which, in the form of its K salt, has the formula

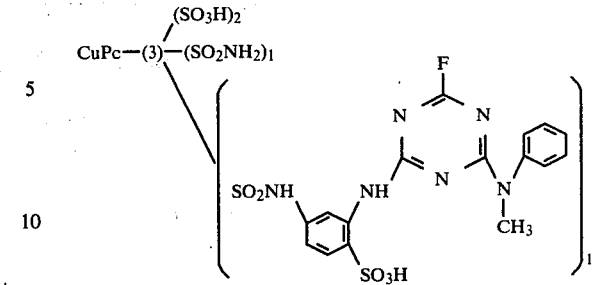

is obtained in virtually quantitative yield. Cotton can be printed in a turquoise shade with this dyestuff.

Further valuable reactice dyestuffs are obtained analogously when the aminophthalocyanine derivatives indicated in column 2 of Table 2 which follows are subjected to a condensation reaction, first with 2,4,6-trifluorotriazine and then with the amines indicated in column 3.

TABLE 2

| No. | Aminophthalocyanine derivative | Amine | Colour shade on cotton |
|---|---|---|---|
| 1 | $CuPc-(3){\overset{(SO_3H)_2}{(SO_2NH_2)_1}}$ {SO$_2$NH-C$_6$H$_3$(NH$_2$)(SO$_3$H)}$_1$ | aniline (NH$_2$-C$_6$H$_5$) | turquoise-blue |
| 2 | $CuPc-(3){\overset{(SO_3H)_2}{(SO_2NH_2)_1}}$ {SO$_2$NH-C$_6$H$_3$(SO$_3$H)(NH$_2$)}$_1$ | 4-methylaniline | turquoise-blue |
| 3 | $CuPc-(3){\overset{(SO_3H)_2}{(SO_2NH_2)_1}}$ {SO$_2$NH-C$_6$H$_4$-CONH-C$_6$H$_3$(SO$_3$H)(NH$_2$)}$_1$ | N-methylaniline | turquoise-blue |
| 4 | $CuPc-(3){\overset{(SO_3H)_2}{(SO_2NH_2)_1}}$ {SO$_2$NH-C$_6$H$_4$-C$_6$H$_3$(SO$_3$H)(NH$_2$)}$_1$ | 3-chloroaniline | turquoise-blue |
| 5 | $CuPc-(4){\overset{(SO_3H)_2}{(SO_2NH_2)_1}}$ {SO$_2$NH-C$_6$H$_3$(NH$_2$)(SO$_3$H)}$_1$ | 4-methoxyaniline | turquoise-blue |
| 6 | $NiPc-(3){\overset{(SO_3H)_2}{(SO_2NH_2)_1}}$ {SO$_2$NH-C$_6$H$_3$(SO$_3$H)(NH$_2$)}$_1$ | 2-methylaniline | bluish-tinged green |

TABLE 2-continued

| No. | Aminophthalocyanine derivative | Amine | Colour shade on cotton |
|---|---|---|---|
| 7 | CuPc—(4)$\diagdown$(SO$_3$H)$_2$ / (SO$_2$NH$_2$)$_1$ / (SO$_2$NH—C$_6$H$_3$(NH$_2$)(SO$_3$H))$_1$ | N-methylaniline (NHCH$_3$–C$_6$H$_5$) | turquoise-blue |
| 8 | CuPc—(3)$\diagdown$(SO$_3$H)$_2$ / (SO$_2$NH—C$_6$H$_3$(NH$_2$)(SO$_3$H))$_1$ | 3-acetylamino-aniline (NH$_2$–C$_6$H$_4$–NHCOCH$_3$) | turquoise-blue |
| 9 | CuPc—(3)$\diagdown$(SO$_3$H)$_2$ / (SO$_2$NH—C$_6$H$_3$(SO$_3$H)(NH$_2$))$_1$ | 3-nitro-aniline (NH$_2$–C$_6$H$_4$–NO$_2$) | turquoise-blue |
| 10 | CuPc—(3)$\diagdown$(SO$_3$H)$_3$ / (SO$_2$NH—C$_6$H$_3$(SO$_3$H)(NH$_2$))$_1$ | 1-naphthylamine | turquoise-blue |
| 11 | CuPc—(3)$\diagdown$(SO$_3$H)$_2$ / (SO$_2$NH$_2$)$_1$ / (SO$_2$NH—C$_6$H$_3$(NH$_2$)(SO$_3$H))$_1$ | N-ethyl-1-naphthylamine (NHC$_2$H$_5$) | turquoise-blue |
| 12 | CuPc—(4)$\diagdown$(SO$_3$H)$_2$ / (SO$_2$NH$_2$)$_1$ / (SO$_2$NH—C$_6$H$_3$(NH$_2$)(SO$_3$H))$_1$ | 5-hydroxy-1-naphthylamine (1-NH$_2$, 5-OH) | turquoise-blue |
| 13 | CuPc—(3)$\diagdown$(SO$_3$H)$_3$ / (SO$_2$NH—C$_6$H$_3$(SO$_3$H)(NH$_2$))$_1$ | 1-amino-2-ethoxynaphthalene (NH$_2$, OC$_2$H$_5$) | turquoise-blue |

EXAMPLE 3

3.3 g of m-toluidine are dissolved in 150 g of water with the addition of 30 ml of 1 N hydrochloric acid. 4.25 g of 2,4,6-trifluoro-1,3,5-triazine are allowed to run dropwise into this solution in the course of 5 minutes, at 0°–3° C., and during the addition the pH value of the solution is kept between 3.0 and 3.8. The reaction mixture is then stirred for a further 10–15 minutes at 0°–5° C.

21.6 g of the phthalocyanine dyestuff of the formula

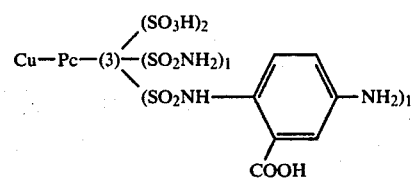

(obtained by reaction of Cu-Pc-(3)-(SO$_2$Cl/SO$_3$H)$_4$ with 2-amino-5-acetylamino-benzoic acid and ammonia and subsequent acid or alkaline saponification of the acetylamino group) are dissolved in 200 g of water with the addition of sodium hydroxide solution, at a pH value of 7.0. The suspension obtained in paragraph 1 is added in the course of about 15 minutes to the solution, which has been cooled to 0°-3° C. During the addition, the pH value of the solution is kept between 5.5 and 6.5 by means of NaHCO₃ solution and the solution is stirred at this pH value for a further ½ hour at 0°-5° C., ½ hour at 5° to 20° C. and ½ hour at 20°-25° C. The dyestuff is salted out with NaCl, filtered off and washed with 10% strength NaCl solution. After drying at 50°-60° C., the dyestuff which, in the form of its free acid, has the formula

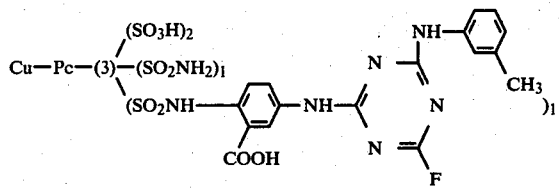

is obtained in very good yield. It dyes cotton in turquoise-blue shades.

If the equimolar amount of the phthalocyanine dyestuff of the formula

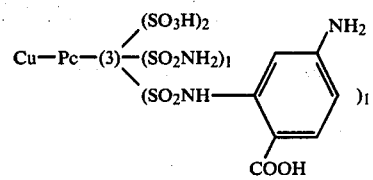

(obtained by reaction of Cu-Pc-(3)-(SO₂Cl/SO₃H)₄ with 2-amino-4-acetylamino-benzoic acid and ammonia and subsequent acid or alkaline saponification of the acetylamino group) is used in place of the phthalocyanine dyestuff named in paragraph 2 and in other respects the procedure is as described in paragraphs 1 and 2, the dyestuff which, in the form of its free acid, has the formula

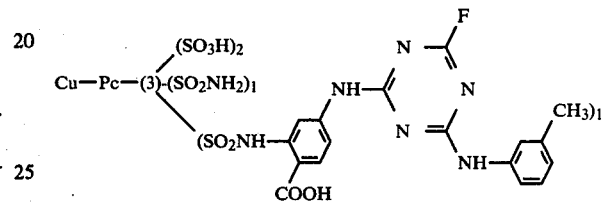

is obtained. It dyes cotton in turquoise-blue shades.

Further valuable reactive dyestuffs are obtained analogously when the amines indicated in column 3 of the table which follows are acylated with 2,4,6-trifluoro-1,3,5-triazine and the resulting difluorotriazinylamines are subjected to a condensation reaction with the aminophthalocyanine derivatives having the formulae given in column 2.

TABLE 3

| No. | Aminophthalocyanine derivative | Amine | Colour shade on cellulose |
|---|---|---|---|
| (1) | Cu—Pc—(3)(SO₃Na)₂(SO₂NH₂)₁(SO₂NH—C₆H₃(COOH)—NH₂)₁ | p-toluidine | turquoise |
| (2) | " | aniline | turquoise |
| (3) | " | 3-methoxyaniline | turquoise |
| (4) | Cu—Pc—(3)(SO₃Na)₂(SO₂NH₂)₁(SO₂NH—C₆H₃(COOH)—NH₂)₁ | N-methylaniline | turquoise |
| (5) | " | 4-methoxyaniline | turquoise |
| (6) | Ni—Pc(3)(SO₃H)₃(SO₂NH—C₆H₃(COOH)—NH₂)₁ | o-toluidine | green |
| (7) | Ni—Pc—(3)(SO₃H)₂(SO₂NH—C₆H₃(COOH)—NH₂)₁ | 2-methoxyaniline | green |

TABLE 3-continued

| No. | Aminophthalocyanine derivative | Amine | Colour shade on cellulose |
|---|---|---|---|
| (8) | Cu—Pc—(4)(SO₃H)₂(SO₂NH₂)₁(SO₂NH—C₆H₃(NH₂)(COOH))₁ | aniline | turquoise-blue |
| (9) | Cu—Pc—(3)(SO₃H)₂(SO₂NH—C₆H₃(NH₂)(COOH))₁ | p-toluidine | turquoise |
| (10) | Cu—Pc—(4)(SO₃H)₂(SO₂NH₂)₁(SO₂NH—C₆H₃(NH₂)(COOH))₁ | o-toluidine | turquoise-blue |
| (11) | Cu—Pc—(3)(SO₃H)₂(SO₂NH—C₆H₃(NH₂)(COOH))₁ | 3-ethylaniline | turquoise |
| (12) | Cu—Pc—(3)(SO₃H)₂(SO₂NH₂)₁(SO₂NH—C₆H₃(NH₂)(COOH))₁ | 3,5-dimethylaniline | turquoise |
| (13) | Cu—Pc—(3)(SO₃H)₂(SO₂NH₂)₁(SO₂NH—C₆H₃(NH₂)(COOH))₁ | 1-napthylamine | turquoise |
| (14) | " | 1-ethylamino-napthalene | turquoise |
| (15) | Ni—Pc—(3)(SO₃H)₂(SO₂NH—C₆H₃(NH₂)(COOH))₁ | 2-ethoxy-1-naphthylamine | green |
| (16) | Cu—Pc—(3)(SO₃H)₂(SO₂N(CH₃)₂)₁(SO₂NH—C₆H₃(NH₂)(COOH))₁ | 3-chloroaniline | turquoise |

EXAMPLE 4

21.5 g of the phthalocyanine dyestuff of the formula

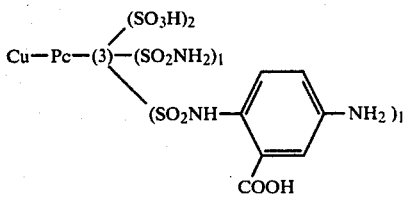

(obtained by reaction of Cu-Pc-(3)-(SO₂Cl/SO₃H)₄ with 2-amino-5-acetylamino-benzoic acid and ammonia and subsequent acid or alkaline saponification of the acetylamino group) are dissolved in 200 ml of water with the addition of sodium hydroxide solution, at pH 7. 4 g of 2,4-difluoro-6-methylamino-1,3,5-triazine are sprinkled in at 18°–22°, whilst stirring well. The mixture is stirred at 18°–25° C. until the reaction had ended, the pH value of the solution being kept at 5.5 to 6.5 by means of sodium hydroxide solution. The dyestuff is then salted out by adding sodium chloride, filtered off, washed with 10% strength sodium chloride solution and dried at 60° C. The dyestuff which, in the form of its free acid, has the formula

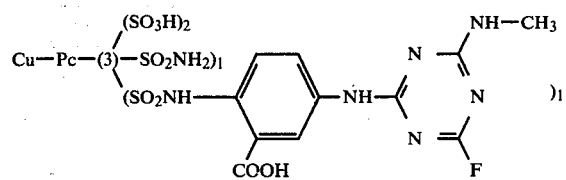

is obtained in virtually quantitative yield. It dyes cotton in turquoise-blue shades.

Further valuable reactive dyestuffs are obtained analogously when the difluoro-triazine derivatives indicated in column 3 of the table which follows are subjected to a condensation reaction with the aminophthalocyanine derivatives having the formulae indicated in column 2.

TABLE 4

| No. | Aminophthalocyanine derivative | Difluoro-triazine derivative | Colour shade on cellulose |
|---|---|---|---|
| (1) | Cu—Pc—(3)⟨(SO₃H)₂ / (SO₂NH₂)₁ / (SO₂NH—C₆H₃(CH₃)(NH₂)(SO₃H))₁ | 2,4-difluoro-6-methylamino-1,3,5-triazine | turquoise |
| (2) | Cu—Pc—(3)⟨(SO₃H)₂ / (SO₂NH₂)₁ / (SO₂NH—C₆H₃(NH₂)(COOH))₁ | 2,4-difluoro-6-methylamino-1,3,5-triazine | turquoise |
| (3) | Cu—Pc—(4)⟨(SO₃H)₂ / (SO₂NH₂)₁ / (SO₂NH—C₆H₃(NH₂)(COOH))₁ | 2,4-difluoro-6-methylamino-1,3,5-triazine | turquoise-blue |
| (4) | Ni—Pc—(3)⟨(SO₃H)₃ / (SO₂NH—C₆H₃(NH₂)(COOH))₁ | 2,4-difluoro-6-methylamino-1,3,5-triazine | green |
| (5) | Ni—Pc—(3)⟨(SO₃H)₂ / (SO₂NH—C₆H₃(NH₂)(COOH))₁ | 2,4-difluoro-6-methylamine-1,3,5-triazine | green |
| (6) | Cu—Pc—(3)⟨(SO₃H)₂ / (SO₂NH₂)₁ / (SO₂NH—C₆H₃(NH₂)(COOH))₁ | | |
| (7) | Cu—Pc—(3)⟨(SO₃H)₂ / (SO₂NH₂)₁ / (SO₂NH—C₆H₃(NH₂)(COOH))₁ | 2,4-difluoro-6-dimethylamino-1,3,5-triazine | turquoise |
| (8) | " | 2,4-difluoro-6-anilino-1,3,5-triazine | turquoise |

TABLE 4-continued

| No. | Aminophthalocyanine derivative | Difluoro-triazine derivative | Colour shade on cellulose |
|---|---|---|---|
| (9) | Cu—Pc—(3)⟨(SO₃H)₂ / (SO₂NH₂)₁ / (SO₂NH—C₆H₃(NH₂)(COOH))₁⟩ | 2,4-difluoro-6-diethylamino-1,3,5-triazine | turquoise |
| (10) | Cu—Pc—(3)⟨(SO₃H)₂ / (SO₂NH—C₆H₃(NH₂)(COOH))₁⟩ | 2,4-difluoro-6-diethylamino-1,3,5-triazine | turquoise |
| (11) | Ni—Pc—(3)⟨(SO₃H)₃ / (SO₂NH—C₆H₃(NH₂)(COOH))₁⟩ | 2,4-difluoro-6-diethylamino-1,3,5-triazine | green |
| (12) | " | 2,4-difluoro-6-anilino-1,3,5-triazine | green |

DYEING EXAMPLE 1

220 ml of water at 20°–25° C. are initially introduced into a dye beaker which has a capacity of 500 ml and is in a heatable water bath. 0.3 g of the dyestuff obtained according to Example 3, paragraph 2, are mixed well to a paste with 2 ml of cold water and 48 ml of hot water (70° C.) are added. The dyestuff solution, which has a pH value of 7–8, is added to the water initially introduced and 10 g of cotton yarn are continuously agitated in this dye liquor. The temperature of the dye liquor is raised to 60° C. in the course of 10 minutes, 15 g of sodium sulphate (anhydrous) are added and dyeing is continued for a further 30 minutes. 2 g of sodium carbonate are then added to the dye liquor and dyeing is carried out for 60 minutes at 60° C. The dyed material is then removed from the dye liquor, the adhering liquor is removed by wringing out or squeezing off and the material is rinsed thoroughly, first with cold water and then with hot water until the rinsing liquor is no longer stained. The dyed material is then soaped for 20 minutes at the boil in 500 ml of a liquor which contains 0.5 g of a sodium alkylsulphonate, rinsed again and dried at 60°–70° C. in a drying cabinet. The cotton is stained in a clear and turquoise-blue shade which is fast to wet processing.

DYEING EXAMPLE 2

3 g of the dyestuff which is obtained according to Example 4, paragraph 1, are stirred with 5 g of urea and 1 g of sodium m-nitrobenzenesulphonate, mixed well to a paste with 10 ml of water at 20°–25° C. and dissolved with 80 ml of water at 20° C., with stirring, at pH 7–8. 20 ml of a 10% strength sodium carbonate solution are added to this solution. Using the padding liquor thus obtained, 20 g of cotton fabric are padded on a laboratory padder, the rollers of which are pressed against one another under a pressure such that the liquor pick-up of the cotton fabric is about 80% of its dry weight. The fabric padded in this way is stretched on a stenter frame and dried in a drying cabinet for 15 minutes at 60°–70° C. and then steamed for 3 minutes at 102° C. The dyed material is rinsed thoroughly, first with cold water and then with hot water until the rinsing liquor is no longer stained. The dyed material is then soaped for 20 minutes at the boil in 500 ml of a liquor which contains 0.5 g of a sodium alkylsulphonate, rinsed again and dried in a drying cabinet at 60°–70° C.

The dyestuff has been taken up in a clear, turquoise-blue shade which is fast to wet processing.

DYEING EXAMPLE 3

20 g of a wool hank are introduced at 40° C. into a dyebath, which consists of 0.5 g of the dyestuff obtained according to Example 3, paragraph 3 (dissolved at pH 7–8), 3.0 g of a polyglycol ether, prepared according to DAS (German Published Specification) 1,041,003, Example 9, 5.0 g of sodium sulphate and 1.2 g of 30% strength acetic acid per liter, and the bath is warmed to 80° C. in the course of 15 minutes. The bath is left at this temperature for 30 minutes and is then heated to the boil and this temperature is maintained for about one hour. After rinsing with water a turquoise-blue dyeing which is fast to potting and fast to milling is obtained.

PRINTING EXAMPLE

A piece of cotton is printed with a printing paste consisting of 50 g of the dyestuff from Example 1, paragraph 2, 150 g of urea, 20 g of sodium bicarbonate, 10 g of sodium m-nitrobenzenesulphonate, 450 g of a highly viscous alginate thickener and 320 g of water and steamed at 103° C. in a steamer, for example of the Mather-Platt type. The print is then rinsed with cold water, then with hot water and finally with cold water again. A turquoise-blue print which is fast to wet processing is obtained.

We claim:
1. Phthalocyanine dyestuffs which, in the form of the free acid, have the formula

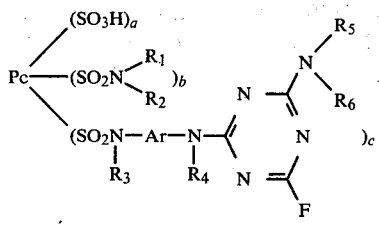

wherein
- Pc is the radical of a copper phthalocyanine or nickel phthalocyanine,
- $R_1$ and $R_2$ are hydrogen or optionally substituted alkyl, or $R_1+R_2$ together with N are a 5-membered or 6-membered heterocyclic ring,
- $R_3$ and $R_4$ are hydrogen or optionally substituted alkyl,
- Ar is arylene substituted by $SO_3H$ or/and COOH and optionally by other atoms or groups of atoms,
- $R_5$ and $R_6$ are hydrogen, optionally substituted alkyl, cycloalkyl or aralkyl or an optionally substituted aryl radical which is free from sulphonic acid and carboxylic acid groups, or $R_5+R_6$ together with N are a 5-membered or 6-membered heterocyclic ring,
- a is 1 to 3,
- b is 0 to 2,
- c is 1 or 2 and
- $a+b+c \leq 4$, and mixtures thereof.

2. Phthalocyanine dyestuffs which, in the form of the free acid, have the formula

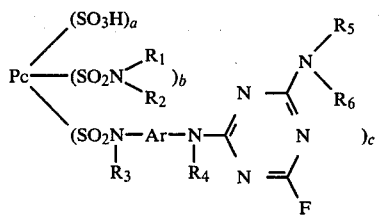

wherein
- Pc is the radical of a copper phthalocyanine or nickel phthalocyanine,
- $R_1$, $R_2$, $R_3$ and $R_4$ are hydrogen, methyl or ethyl, Ar is arylene, substituted by $SO_3H$ or COOH and optionally by other atoms or groups of atoms,
- $R_5$ and $R_6$ are hydrogen, optionally substituted alkyl with 1 to 5 C atoms, optionally substituted cycloalkyl or aralkyl, or an optionally substituted aryl radical which is free from sulphonic acid groups and carboxylic acid groups, or $R_5$ and $R_6$ together with N are a 5-membered or 6-membered heterocyclic ring,
- a is 1 to 3,
- b is 0 to 2,
- c is 1 or 2 and
- $a+b+c=4$.

3. Phthalocyanine dyestuffs which, in the form of the free acid, have the formula

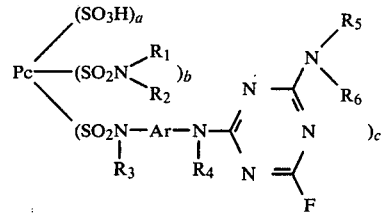

wherein
- Pc is the radical of a copper phthalocyanine or nickel phthalocyanine,
- $R_1$, $R_2$, $R_3$ and $R_4$ are hydrogen, methyl or ethyl, Ar is arylene which is substituted by $SO_3H$ or COOH and optionally by other atoms or groups of atoms,
- $R_5$ and $R_6$ are hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$ together with N are a 5-membered or 6-membered heterocyclic ring,
- $1 < a < 3$,
- $b > 0$,
- c is 1 and
- $a+b+c=3$ or 4.

4. Phthalocyanine dyestuffs which, in the form of the free acid, have the formula

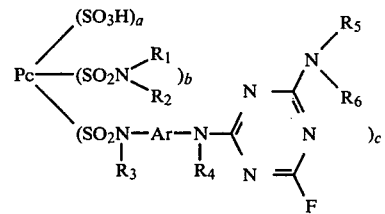

wherein
- Pc is the radical of a copper phthalocyanine or nickel phthalocyanine,
- $R_1$, $R_2$, $R_3$ and $R_4$ are hydrogen, methyl or ethyl,
- Ar is arylene which is substituted by $SO_3H$ or COOH and optionally by other atoms or groups of atoms,
- $R_5$ and $R_6$ are hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$ together with N are a 5-membered or 6-membered heterocyclic ring,
- a is 1 or 2,
- b is 0,
- c is 1 and
- $a+c=2$ or 3.

5. Dyestuffs of claim 1, wherein Ar is phenylene substituted by $SO_3H$.

6. Process for the preparation of phthalocyanine dyestuffs, characterised in that phthalocyanine dyestuffs which contain amino groups and, in the form of the free acid, have the formula

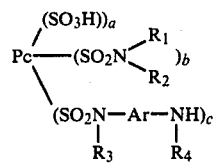

wherein
- Pc is the radical of a copper phthalocyanine or nickel phthalocyanine,
- $R_1$ and $R_2$ are hydrogen or optionally substituted alkyl, or $R_1+R_2$ together with N are a 5-membered or 6-membered heterocyclic ring,
- $R_3$ and $R_4$ are hydrogen or optionally substituted alkyl,
- Ar is arylene substituted by $SO_3H$ or/and COOH and optionally by other atoms or groups of atoms,
- a is 1 to 3,
- b is 0 to 2,
- c is 1 or 2 and
- $a+b+c \leq 4$, are reacted either with c mols of a compound of the formula

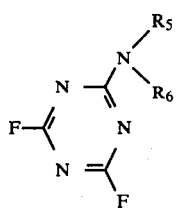

wherein
- $R_5$ and $R_6$ are hydrogen, optionally substituted alkyl, cycloalkyl or aralkyl or an optionally substituted aryl radical which is free from sulphonic acid or carboxylic acid groups, or $R_5+R_6$ together with N are a 5-membered or 6-membered heterocyclic ring, or first with c mols of trifluorotriazine and then with c mols of a compound of the formula

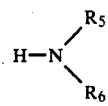

wherein
- $R_5$ and $R_6$ have the meaning indicated above.

7. A method for dyeing and printing textile materials, containing hydroxyl groups and N-containing materials which comprises applying to said materials under dyeing and printing conditions a dyestuff of claim 1.

8. A method of claim 8 wherein the textile materials are made of natural or regenerated cellulose.

9. Textile materials containing hydroxyl groups or N-containing materials dyed or printed with the dyestuffs of claim 1.

10. Triazine compounds of the formula

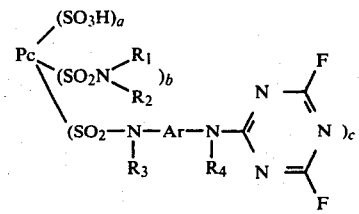

wherein
- Pc, Ar, $R_3$, $R_4$, a, b and c have the meaning indicated in claim 1.

11. Phthalocyanine dyestuffs of claim 1 wherein Ar is phenylene.

* * * * *

UNITED STATES PATENT AND TRADEMARK OFFICE
CERTIFICATE OF CORRECTION

PATENT NO. : 4,268,267
DATED : May 19, 1981
INVENTOR(S) : Karl H. Duchardt et al It is certified that error appears in the above-identified patent and that said Letters Patent are hereby corrected as shown below:

Title Page, Item [30], "Nov. 17, 1978" should read -- Nov. 11, 1978 --.

Column 8, line 18, delete"0°" and substitute --0-5°--.

Signed and Sealed this

Twentieth Day of October 1981

[SEAL]

Attest:

GERALD J. MOSSINGHOFF

Attesting Officer          Commissioner of Patents and Trademarks